United States Patent [19]

Chasteen

[11] 4,328,044
[45] * May 4, 1982

[54] METHOD FOR CLEANING METAL PARTS

[75] Inventor: Jack W. Chasteen, Kettering, Ohio

[73] Assignee: University of Dayton, Dayton, Ohio

[*] Notice: The portion of the term of this patent subsequent to Feb. 12, 1997, has been disclaimed.

[21] Appl. No.: 119,061

[22] Filed: Feb. 6, 1980

Related U.S. Application Data

[63] Continuation-in-part of Ser. No. 874,915, Feb. 2, 1978, Pat. No. 4,188,237.

[51] Int. Cl.$^3$ .............................................. B08B 5/00
[52] U.S. Cl. ................................. 134/2; 134/19; 134/31; 134/37; 228/206
[58] Field of Search ................ 134/2, 11, 19, 31, 37; 228/206; 148/16, 20.3

[56] References Cited

U.S. PATENT DOCUMENTS

| | | | |
|---|---|---|---|
| 2,571,328 | 10/1951 | Baker | 134/2 X |
| 2,585,819 | 2/1952 | Moore et al. | 228/206 |
| 2,851,387 | 9/1958 | Low | 148/16 X |
| 4,188,237 | 2/1980 | Chasteen | 134/2 |

FOREIGN PATENT DOCUMENTS 1454217 11/1976 United Kingdom .

OTHER PUBLICATIONS

"Brazing Stainless Steel in a Stable Reducing Atmosphere of Fluoride", AWS Conference (Philadelphia, Pa.-Apr. 1977).

Watson et al., *Bureau of Mines*, "Decomposition Temperatures of . . . as indicated by Halogen Liberation", Dec. 1950.

*Primary Examiner*—Marc L. Caroff
*Attorney, Agent, or Firm*—Biebel, French & Nauman

[57] ABSTRACT

A method for relatively low temperature cleaning of metal parts, particularly stainless steels, superalloys, solid solution superalloys and gamma prime hardened nickel alloy parts, in order to render them brazable or otherwise bondable. The method makes use of a C—O—H—F atmosphere as the primary cleaning material. The preferred source of the C—O—H—F atmosphere is by thermal decomposition of a fluorocarbon resin and addition of a low moisture containing hydrogen gas.

11 Claims, No Drawings

METHOD FOR CLEANING METAL PARTS

CROSS-REFERENCE TO RELATED APPLICATIONS

This application is a continuation-in-part of application Ser. No. 874,915, filed Feb. 2, 1978, now U.S. Pat. No. 4,188,237, which is specifically incorporated herein by reference.

BACKGROUND OF THE INVENTION

The present invention relates to a method for cleaning unbrazable metal parts sufficiently to render them brazable and more particularly, to a method for the low temperature cleaning of such parts with an atmosphere having the elements H—O—C—F so that the parts can be, thereafter, brazed or otherwise bonded.

Late model gas turbine engines for example, those of the Boeing 747, the DC—10, and the Lockheed 1011) employed in their turbine sections nickel based alloys that are gamma prime hardened. Many other engines contain such materials, and the use of gamma prime hardened alloys will no doubt increase in the future due to the desirable properties of these superalloys.

The problem is that engine parts made of such alloys are very expensive and, at present, are not repairable when crack damaged due to metal fatigue. Attempts to weld repair such components results in post-weld cracking. Likewise, conventional brazing cannot be affected because nickel-base braze alloys will not run on the gamma prime hardened surfaces. Thus, although a molten brazing alloy under high vacuum might stick new gamma prime hardened parts together, it has not previously been possible to place brazing alloy inside cracks in damaged gamma prime hardened alloy parts.

A successful braze is manifest when braze material is placed at the source of a crack (say 0.001 inch wide and one-half inch long) and, at brazing temperature, not only melts and sticks to the parent material, but also runs into and fills the length of the crack. Apparently, in use a gamma prime hardened alloy becomes oxidized (and/or sulfuridized) to the extent that the aluminum, titanium and chromium oxides (or sulfides) which coat the surface of the part, including the surfaces of the crack, prevent successful repair by brazing.

Accordingly, it has been recognized that such parts must be cleaned if they are to be brazed. One suggestion is to use chromium fluoride ($CrF_3$) and hydrogen ($H_2$) to clean damaged parts of gamma prime hardened alloys prior to a braze repair. It is speculated that the following reaction mechanism takes place:

$$(CrF_3 \cdot 3/2\ H_2O) + H_2 \xrightarrow{\Delta} 3HF + Cr + H_2O + H_2 \quad (1)$$

(2) $MO_x + HF \rightarrow MF_x + H_2O + M$

If, then, $MF_x$ is volatile at the reaction temperature, the oxide is effectively reduced and the base metal (M) should be brazable. However, uniform reproducibility of results is for some reason lacking and many parts cleaned by this process are still not brazable.

A much more effective process is that disclosed and claimed in parent application Serial No. 874,915. However, that application is for the most part directed to cleaning crack-damaged gamma prime hardened alloys. It has now been established that a similar process is also effective in cleaning other metals, especially stainless steels, superalloys, and solid solution superalloys, as well as the gamma prime hardened nickel alloys, see companion application Ser. No. 119,060, filed on Feb. 8, 1980 an even date herewith. However, the temperature required by all prior cleaning processes is relatively high.

Fabrication of stainless steel composites by nickel brazing has long been of commercial interest. Before such devices can be fabricated by brazing, however, it is necessary to clean the faying surfaces of all metal oxides (or other compounds). The problems arises because the surfaces of such alloys are covered with a passive film which will not be wetted by a brazing alloy. The most stable oxide in such a film is that of chromium, and any pre-braze cleaning technique necessarily centers on this compound. It is necessary to reduce the chromium oxide (and all other oxides) to its metallic element before brazing can be accomplished.

A technique that is commonly employed to prepare such alloys for brazing is that of exposing them to a dry hydrogen atmosphere at high temperatures (>1000° C.). Hydrogen cleaning is highly functional but has the disadvantage that the cleaning only takes place at temperatures that are near or higher than the brazing temperature. Therefore, in situ cleaning and brazing of stainless steel and superalloy assemblies is often not practicable.

It is known that stainless steel can be brazed in a stable reducing atmosphere of fluoride. In a paper presented by the Toulouse, France, Microturbo Company representatives at the American Welding Society (AWS) meeting in Philadephia in April 1977, entitled "Brazing Stainless Steel in a Stable Reducing Atmosphere of Fluoride," there is described a brazing process carried out in a halogen atmosphere obtained by the decomposition of fluorine salts such as ammonium bifluoride acid and chromium fluoride. The proposed reactions are:

$$NH_4 \cdot HF + Cr \xrightarrow{\Delta} CrF_3 + NH_3 \uparrow + H_2 \uparrow \quad (1)$$

(2) $NH_3 \rightarrow \frac{1}{2}N_2 + 3/2\ H_2$ (on contact with metal)
(3) $CrF_3 + H_2 \uparrow \rightarrow 2HF + \uparrow Cr$
(4) $6HF + Cr_2O_3 \rightarrow 2CrF_3 + H_2 \uparrow + F_2 \uparrow$ There are two pertinent observations regarding these reactions: (a) the object would appear to be the production of HF gas which, in turn, does the cleaning, and (b) any elemental fluorine that forms is produced downstream of the work piece (see reaction 4). It is noted that in the presented paper there is an indication that "the technique cannot be used on assemblies of materials having a high level of electropositivity, such as titanium and zirconium," and "it is essential to avoid the introduction of carbon into the furnace during brazing."

Similarly, Moore in U.S. Pat. No. 3,585,819, discloses a process of fluxing metal parts with a stable, non-oxidizing atmosphere containing HF gas. The metal parts are ones such as steels which are to be brazed or soldered.

Finally, reference is made to Low U.S. Pat. No. 2,851,387. Low relates to a process for nitriding high chromium stainless steels. In Low's discussion of the prior art he notes that all prior processes of depassifying such steels require immediate nitriding or the internal affects of the depassifying were lost. A specific purpose of his invention is a combined activating and nitriding operation which avoids any problems of interruption in the sequence steps. The combined operations are provided by a mixture of decomposed fluorocarbon resin gases and ammonia gas. The result is a nitrided product, but it is believed that a cleaned, brazable product would not be produced.

Accordingly, the need steel exists for relatively low temperature method for cleaning metal parts to render them brazable or otherwise bondable.

SUMMARY OF THE INVENTION

That need is met by the present invention which utilizes a simple, inexpensive method for cleaning metal parts, including stainless steels, superalloys, solid solution superalloys, as well as gamma prime hardened nickel alloys at relatively low temperature. Cleaning is accomplished by subjecting the part to an atmosphere containing carbon, oxygen, hydrogen, and fluorine (C—O—H—F) gaseous elements. When using such a gaseous atmosphere under controlled conditions, as described below, it is possible to adequately clean the metal parts at temperatures below 1000° C. This is to be compared with a commonly employed method of preparing metal parts for brazing by exposing them to a dry hydrogen atmosphere at temperatures above 1000° C. The energy savings obtained from relatively low temperature cleaning are apparent, as is the ability to perform in situ cleaning and brazing.

It has been found that a key to this relatively low temperature cleanability is control of the H/O ratio in the C—O—H—F gaseous atmosphere. Thus, at H/O ratios of around $10^4$, the metal parts can be adequately cleaned at temperatures as low as approximately 800°–850° C. At a ratio of around $10^5$, the metal parts can be adequately cleaned at temperatures as low as approximately 700°–750° C. At even greater H/O ratios, even lower cleaning temperatures are possible.

However, much higher H/O ratios are difficult to obtain. The H/O ratios of $10^4$ and $10^5$ correspond to approximately 200 and 20 ppm $H_2O$, respectively, present as moisture in the hydrogen gas used as a component of the C—O—H—F atmosphere. It is difficult to obtain hydrogen gases any less moist and having fewer parts per million $H_2O$ present.

That is, the oxygen in the C—O—H—F system of the instant invention comes from moisture present in the other components. The hydrogen gas is the main source of that moisture since it is possible to otherwise minimize its presence by deriving the carbon and fluorine components from thermally decomposed fluorocarbon resins. Addition of other oxidizing gases or, for that matter, any substantial amounts of other non-inert gases of any type is to be avoided.

As disclosed in parent application Ser. No. 874,915, it is known that polytetrafluoroethylene resin liberates fluorine when heated to 350° C. or higher and the rate of evolution sharply increases between 400° and 450° C. However, it now appears that the liberation of fluorine is only a part of the decomposition process and that others of the gases produced upon thermal decomposition are also important in the low-temperature cleaning process of the present invention.

Actually, the number of organic gases that could form in the system of the present invention is so large that it defines complete analysis. Thus a simplification is in order. When reduced to its simplest yet feasible form, the system would contain only saturated fluorocarbons and then only the two most simple wherein one involved a double carbon bond, namely, tetrafluoromethane ($CF_4$) and tetrafluoroethylene ($C_2F_4$). It is believed that $C_2F_2$, when mixed with moist hydrogen, reduces the water content by the reaction:

$$C_2F_4 + 2H_2O \rightarrow 4HF + 2CO$$

Thus, the decomposed fluorocarbon resin gases are not only moisture-free, but also react with the moisture otherwise introduced to, overall, create an extremely reducing atmosphere. That atmosphere is capable of cleaning metal surfaces of formed oxides to render them brazable or otherwise bondable.

As mentioned, in many such applications, the most thermodynamically stable oxide that is found in the oxidation or passivation layer is that of chromium. Such layers may be a disadvantage in welding and/or a deterrent to brazing. Furthermore, due to the relative stability of its oxide, if Cr could be stablized in favor of its oxide, the other metallic elements in the oxide film should be similarly reduced. Thus if an oxidized alloy which contains chromium were exposed to an atmosphere in which elemental chromium is stable, and then cooled in an atmosphere which had insufficient oxidizing power to a reform the oxides, the result is an alloy at room temperature which is readily brazable. This is accomplished by the present cleaning process.

Accordingly, it is an object of the present invention to provide a method for cleaning metal parts, including stainless steels, superalloys, solid solution superalloys, and gamma prime hardened nickel alloy parts, at relatively low temperatures by use of a C—O—H—F gaseous atmosphere.

Other objects and advantages of the present invention will be apparent from the following description and the appended claims.

DESCRIPTION OF THE PREFERRED EMBODIMENT

As mentioned, a preferred embodiment of the present invention is to utilize a thermally decomposable fluorocarbon resin along with a hydrogen gas to clean unbrazable metal parts and render them brazable at commercial vacuum levels ($10^{-2}$ to $10^{-4}$ Torr).

In terms of the ability to clean at relatively low temperature, it is now known that this is dependent upon the H/O ratio found in the C—O—H—F atmosphere. Using a H/O ratio of $10^5$, a pressure of 1 atms., and considering only the chromium portion of a stainless steel or solid solution superalloy, it appears that at some temperature before the system reaches 700° C. and up to 800° C., the $Cr_2O_3$ in the oxidation layer will tend to convert to $CrF_3$. At 800° C. and up to 1000° C., the $CrF_3$ and any remaining $Cr_2O_3$ will tend to convert to elemental Cr. The system can be held at below 1000° C. at a designated point P (discussed below) until all Cr compounds have converted to Cr metal. AT this point, the system should be cooled under pure $H_2$ or a dry inert gas. The result will be an oxide (and fluoride) free metal surface with a thin layer of chromium metal.

The point P corresponds to the C/H, F/H and H/O ratios as follows:

$C/H = 0.004$ $F/H = 0.04$ $H/O = 10^5$

The foregoing conditions result in the following equations:

$$\frac{p_{CF_4}}{2p_{H_2} + 2p^{H_2O} + p_{HF}} = 0.004$$

$$\frac{4p_{CF_4} + p_{HF}}{2p_{H_2} + 2p_{H_2O} + p_{HF}} = 0.04$$

$$\frac{2p_{H_2} + 2p_{H_2O} + p_{HF}}{p_{H_2O}} = 10^5$$

$$p_{H_2} + p_{HO_2} + p_{CF_4} + p_{HF} = 1.0$$

These equations indicate a gas mixture of the following approximate composition:

$H_2 = 94.5$ v/o $HF = 4.7$ v/o $CF_4 = 0.8$ v/o $H_2O = 0.002$ v/o

The gas is readily contrived by creating a mixture HF, $CF_4$, and $H_2$ (with 20 ppm $H_2O$) in the proper proportions. The preferred source of those gases is thermally decomposed fluorocarbon resin and low moisture $H_2$ gas. Other sources may also be used as long as the proportions necessary to obtain the calculated P points are present. This gas mixture will destabilize chromium in preference to its oxide or fluoride for temperatures between 800° and 1000° C. under the conditions that thermodynamic equilibrium is reached.

Since the chromium oxides are the most difficult to stabilize, it should be apparent that by doing so, the present invention enables the low temperature cleaning of metal parts, including stainless steel, superalloys, solid solution superalloys, as well as gamma prime hardened nickel based alloys, by removing chromium oxides and any less stable oxides. It also enables the in situ brazing of those parts at such low temperatures.

While the method and product produced by that method herein described constitute a preferred embodiment of the invention, it is to be understood that the invention is not limited to this precise method and product, and that changes may be made therein without departing from the scope of the invention which is defined in the appended-claims.

What is claimed is:

1. In a method for brazing or otherwise metallic bonding metal parts comprising cleaning said parts to depassivate the surface and thereafter brazing or forming a metal-metal bond, the improvement which comprises cleaning said parts by a process consisting essentially of:

(a) placing the part in a hermetically sealed chamber, (b) subjecting said part to a gaseous atmosphere in said chamber, said atmosphere containing the elements C—O—H—F and including $CF_4$, $C_2F_4$, HF and $H_2$ in amounts sufficient to clean said metal parts and having an H/O ratio of $10^4$ or greater, (c) at the same time heating said chamber to a temperature of less than 1000° C., (d) allowing said part to remain in said heated chamber filled with said atmosphere for a period of time sufficient to clean said part and render it brazable or otherwise able to form a metal-metal bond, and (e) cooling said chamber and said part prior to removing it from said chamber.

2. The method of claim 1 wherein said H/O ratio is about $10^4$ and said temperature is approximately 800°–1000° C.

3. The method of claim 1 wherein said H/O ratio is about $10^5$ and said temperature is approximately 700°–1000° C.

4. The method of claim 1 wherein said C—O—H—F atmosphere is produced by the thermal decomposition of a fluorocarbon resin to which there is added a low moisture containing hydrogen gas without addition of any substantial amounts of other non-inert gases.

5. The method of claim 4 wherein said fluorocarbon resin is polytetrafluoroethylene resin.

6. The method of claim 5 wherein the moisture present in said hydrogen gas is less than approximately 200 ppm.

7. The method of claim 6 wherein said temperature is approximately 800°–1000° C.

8. The method of claim 6 wherein the moisture present in said hydrogen gas is less than approximately 20 ppm.

9. The method of claim 8 wherein the temperature is approximately 700°–1000° C.

10. The method of claim 1 wherein said metal part is a material selected from the group consisting of stainless steels, superalloys, solid solution superalloys, and gamma prime hardened nickel alloys.

11. The method of claim 1 further including the step of in situ brazing of said metal part following the cleaning steps.

* * * * *

UNITED STATES PATENT AND TRADEMARK OFFICE
CERTIFICATE OF CORRECTION

PATENT NO. : 4,328,044
DATED : May 4, 1982
INVENTOR(S) : Jack W. Chasteen

It is certified that error appears in the above—identified patent and that said Letters Patent is hereby corrected as shown below:

Column 2, line 10, "problems" should be --problem--.

Column 3, line 66, "defines" should be --defies--.

Column 4, line 4, "$C_2F_2$" should be --$C_2F_4$--.

Column 5, line 34, "destabilize" should be --stabilize--.

Column 5, line 39, "stabilize" should be --destabilize--.

Signed and Sealed this

Third Day of August 1982

[SEAL]

Attest:

GERALD J. MOSSINGHOFF

Attesting Officer — Commissioner of Patents and Trademarks